No. 627,990. Patented July 4, 1899.
J. W. EISENHUTH.
BICYCLE AND GEARING THEREFOR.
(Application filed Jan. 5, 1898. Renewed May 22, 1899.)
No Model. 3 Sheets—Sheet 2.
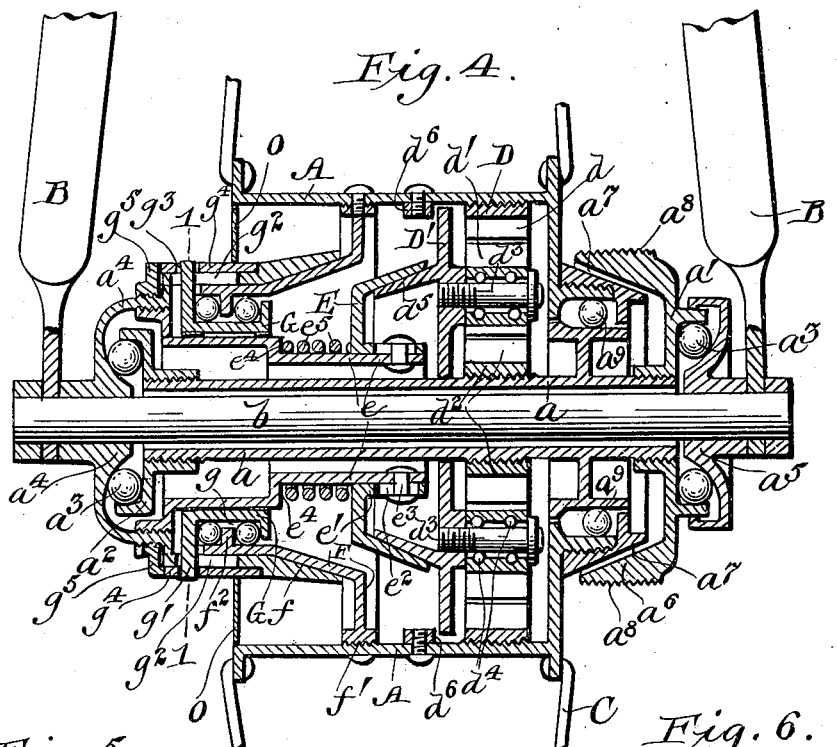
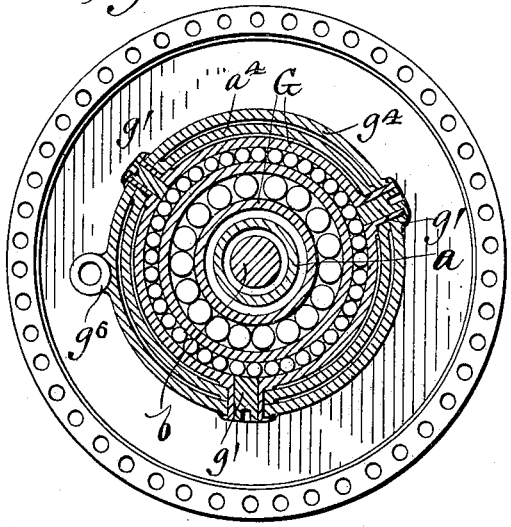
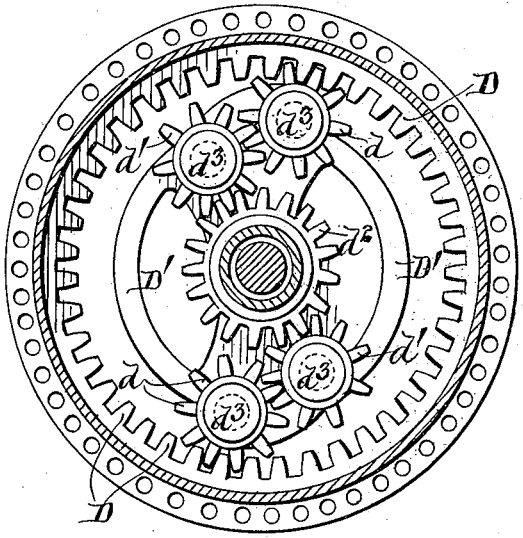
WITNESSES
INVENTOR
THE NORRIS PETERS CO., PHOTO-LITHO., WASHINGTON, D. C.

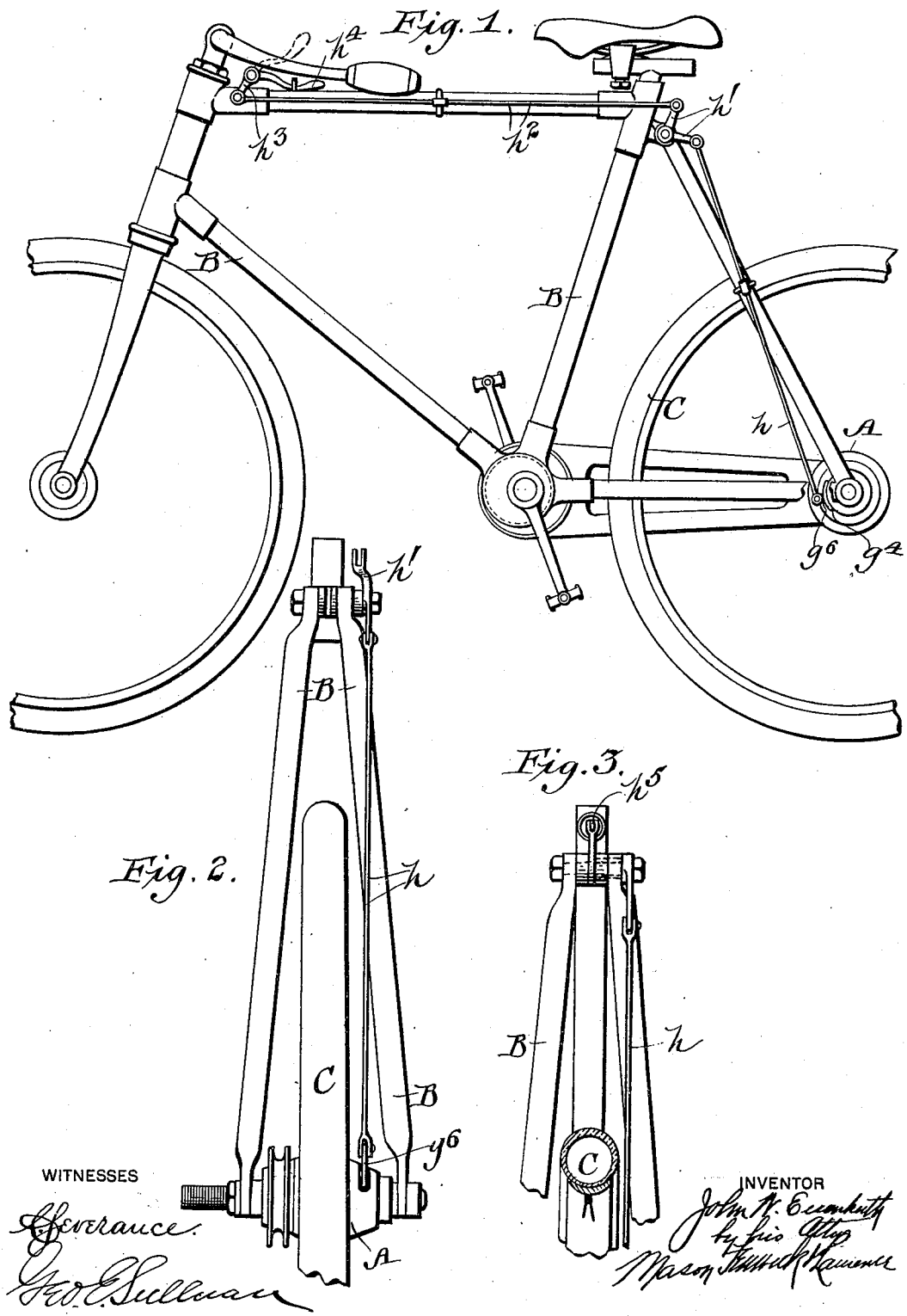

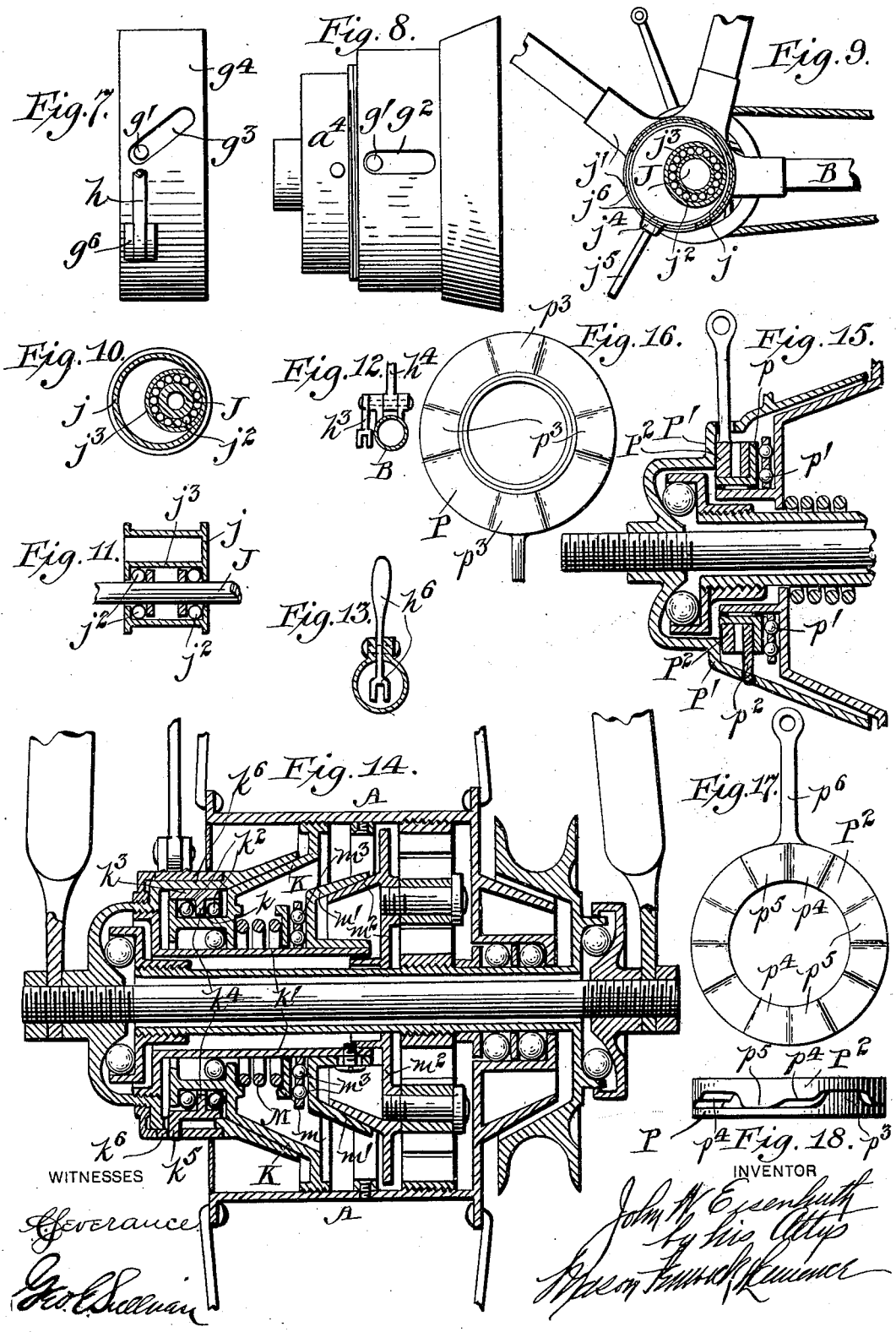

UNITED STATES PATENT OFFICE.

JOHN WASHINGTON EISENHUTH, OF NEW YORK, N. Y.

BICYCLE AND GEARING THEREFOR.

SPECIFICATION forming part of Letters Patent No. 627,990, dated July 4, 1899.

Application filed January 5, 1898. Renewed May 22, 1899. Serial No. 717,798. (No model.)

*To all whom it may concern:*

Be it known that I, JOHN WASHINGTON EISENHUTH, a citizen of the United States, residing at New York, in the county of New York and State of New York, have invented certain new and useful Improvements in Bicycles and Gearing Therefor; and I do hereby declare the following to be a full, clear, and exact description of the invention, such as will enable others skilled in the art to which it appertains to make and use the same.

My invention relates to improvements in bicycles and other vehicles, and has relation more particularly to the gearing and running-gear thereof and means for controlling the same.

It consists in a bicycle having a changeable-speed mechanism embracing a hub, a loose sleeve mounted in the axle, means for imparting motion to the said sleeve, gearing interposed between the said sleeve and the hub, and means for moving the hub with respect to the axle for bringing the said gearing into and out of engagement, whereby the speed of the hub may be increased or diminished.

It further consists in a bicycle or similar vehicle having a suitable hub, a sleeve loosely mounted upon the axle, means for rotating the same, a frictional cup upon the said sleeve adapted to engage a corresponding frictional surface upon the hub, gearing interposed directly between the said hub and the said sleeve, and means for moving the hub for changing the speed.

It also consists in certain other novel constructions, combinations, and arrangements of parts, as will be hereinafter more fully described and claimed.

In the accompanying drawings, Figure 1 represents a side elevation of a bicycle constructed in accordance with my invention. Fig. 2 is a detail rear elevation of the same. Fig. 3 represents a similar view showing a little different arrangement of the parts. Fig. 4 is a vertical central section through the hub of the wheel, which is provided with the speed-changing mechanism. Fig. 5 is a vertical sectional view taken upon the line 1 1 of Fig. 4. Fig. 6 represents a sectional view through the hub of the wheel, showing the gearing interposed between the said hub and the axle in side elevation. Fig. 7 represents a detail view of a sliding collar used upon the hub of the wheel for changing the speed mechanism. Fig. 8 represents a detail view of one of the frictional cups mounted upon the axle of the bicycle. Fig. 9 is an enlarged detail view of the chain or cable tightening mechanism employed upon my improved bicycle. Figs. 10 and 11 represent, respectively, detail longitudinal and transverse sectional views through the same. Fig. 12 is a detail view showing the means of mounting the hand operating-lever which controls the speed mechanism. Fig. 13 is a detail view showing the operating-handle mounted so as to extend interiorly of the bicycle-tubing. Fig. 14 represents a vertical section through the hub, showing a slightly-different arrangement of the speed mechanism. Fig. 15 represents a detail sectional view showing another means for operating the speed-changing mechanism. Figs. 16 and 17 represent plan views of the cam-plates mounted therein, and Fig. 18 represents a detail edge view of a portion of the same.

In constructing my improved bicycle I contemplate mounting the speed-changing mechanism in the hub of the rear or driving wheel, A representing the said hub, B representing the frame of the bicycle, and C the rear wheel.

The rear axle $b$ is rigidly secured in the frame B in any suitable manner, preferably by nuts engaging screw-threads formed upon the said axle. A sleeve, as $a$, is slipped upon the said axle, being a little larger than the diameter thereof, and being provided at its ends with cups $a'$ $a^2$, which are adapted to hold balls $a^3$ $a^3$ against cones $a^4$ $a^5$, which are mounted upon the axle just inside the frame B. By this means the sleeve $a$ is supported upon the axle by means of the ball-bearings. The cup $a'$ is formed with an inwardly-extending flange portion $a^6$, which is provided upon its inner surface with a frictional bearing-surface adapted to engage a corresponding surface $a^7$, formed upon the hub A of the wheel C. While the outer surface of the flange $a^6$ may be provided with integral sprocket-teeth or with an integral cable-groove formed thereon, yet I prefer to form threads upon the periphery of the said flange $a^6$ as at $a^8$, which are adapted to engage corresponding threads formed interiorly of a sprocket-wheel or a grooved pulley which may be thus secured in place upon the said flange $a^6$. By this means the sprocket-wheel or the pulley may be interchangeably put into place according as is desired to use a sprocket-chain or a cable for running the bicycle. Also the sprocket-wheels or pulleys of different sizes may be placed upon the said flange, according to the speed which it is desired to impart to the wheel.

In order to support the hub A upon the sleeve $a$ on the sprocket side of the bicycle, I provide ball-bearings, as at $a^9$, adapted to run in suitable ball-races formed interiorly of the frictional flange $a^7$ on the hub and upon the sleeve $a$. Interiorly of the hub A is secured an internal gear, as D, which is adapted to be engaged by intermediate pinions $d$ and $d'$, which are mounted upon a stud-plate D', the said stud-plate running free upon the sleeve $a$. Motion is imparted to the said intermediate gears by means of a pinion $d^2$, rigidly secured to the sleeve $a$. While I may employ any number of intermediate pinions, I prefer to use, as shown in the drawings, two sets of the same, mounted upon the opposite sides of the stud-plate D'. The pinions $d\ d'$ are preferably mounted upon studs, as $d^3\ d^3$, secured to the stud-plate D', ball-bearings $d^4$ being interposed between the said pinions and the said studs to lessen the friction of the parts. The stud-plate D' is also provided with an annular flange $d^5$, having an outer frictional bearing-surface adapted to engage a corresponding frictional bearing-surface upon a friction-cup E. The friction-cup E is mounted upon a sleeve $e$, which is rigidly secured to an extended annular portion of the cone $a^4$. The cup E is provided with a short hub portion, as $e'$, which is adapted to slide longitudinally upon the said sleeve $e$, the said sleeve being provided with one or more longitudinal slots $e^2$, which are engaged by one or more pins $e^3$, secured to the said sleeve $e$. By this means the cup E is capable of longitudinal movement upon the said sleeve, but is forced to remain stationary therewith, so as not to revolve. An annular shoulder, as $e^4$, is formed in the sleeve $e$, and a coil-spring, as $e^5$, is interposed between the said shoulder and the said cup E, so that the said cup is normally forced away from the said shoulder and in engagement with a flange $b^5$. The cone $a^4$ is provided with an annular flange adapted to extend considerably into the hub of the wheel, the said flange having upon its inner surface a frictional bearing-surface, as $f$, which is adapted to engage a corresponding bearing-surface formed upon the annular flanged disk F, which is secured rigidly to the hub A, as at $f'$. The disk F extends into the flange portion of the cone $a^4$ for quite a distance and is provided with a vertical inwardly-extending annular flange $f^2$, forming a ball-race upon each side thereof interiorly of the said disk F. A loose collar, as G, is mounted upon the stationary sleeve E and is provided with a groove, as $g$, adapted to hold balls in place in the two ball-races formed by the flange $f^2$. The collar G is also provided at suitable intervals with pins, as $g'$, which extend through slots, as $g^2$, formed in the flanged portion of the cone $a^4$. It will be apparent that by this construction the grooved collar G may have longitudinal movement upon the sleeve $e$ and with respect to the flange of the cone $a^4$. In order to control the longitudinal movement of this grooved collar G, the pins G' extend beyond the flange of the cone $a^4$ and engage diagonal or inclined grooves, as $g^3$, formed in an external collar or sleeve $g^4$, mounted upon the outer surface of the flange of the cone $a^4$. This collar is held in place by means of an annular shoulder formed upon the said flange and a nut or washer $g^5$, screwed upon the said cone after the said sleeve has been put in place. It will be readily seen from this description that if the sleeve $g^4$ be rotated the pins $g'$, engaging the inclined slots therein, which force the grooved collar longitudinally with respect to the axle of the wheel and the said grooved collar by means of the interposed ball-bearings, will move the disk F and the hub of the wheel A to a corresponding degree. The ball-bearings which engage the disk F also serve as an antifrictional support for this side of the hub. In order to carry the stud-plate D' longitudinally with the hub A, antifrictional rollers, as $d^6$, are mounted on the inner surface of the hub A and engage the outer edge of the stud-plate D' when the said hub A is forced toward the grooved pulley or sprocket-wheel. The sprocket-wheel or grooved pulley, which is mounted upon the flange $a^6$, is preferably of such a size with respect to the driving mechanism as to produce the highest speed at which it is wished to propel the bicycle, so that when the flange $a^6$ is held in engagement with the flange $a^7$ of the hub of the wheel the wheel will be revolved at a high rate of speed. When the hub of the wheel has been thus forced longitudinally by means of the grooved collar G to engage the flange $a^6$, the rollers $d^6$ will have engaged the stud-plate D' and separated the flange $d^5$ from the cup E, so that the stud-plate will run freely upon the sleeve $a$, and the interposed gearing will have no effect upon the hub. At the same time the brake-disk F will be moved away from the frictional surface $f$ of the cone $a^4$. When it is desired to decrease the speed of the bicycle, the sleeve $g^4$ is revolved by means which will be hereinafter more fully described, so as to move the collar G and draw the hub A toward the cup E. When the cup E engages the flange $d^5$, the stud-plate D' will be held stationary and the movement from the grooved pulley or sprocket-wheel, which is now free from the flange $d^7$, will be actuated through the intermediate gearing $d^2$, $d'$, $d$, and D. It will be apparent that by means of the spring $e^5$ the cup E will engage the flange of the stud-plate before the brake-disk F engages the flange of the cone-cup. This spring $e^5$ will also permit of the hub being moved still farther toward the cone $a^4$, so as to bring the brake-disk F into contact with the frictional surface $f$. This may be regulated according to the desire of the rider, so as to merely decrease the speed of the wheel slightly or to bring it to a full stop.

In order to facilitate the revolving of the sleeve $g^4$, I provide the same with a projecting stud $g^6$, which is provided with an aperture adapted to be engaged by a bolt for securing the end of a link or rod $h$ to the said stud. The rod $h$ extends upwardly toward the top of the frame and is pivotally secured to a bell-crank lever $h'$, the said lever being pivotally mounted to the frame just below the seat of the bicycle. The other arm of the bell-crank lever $h'$ is pivotally connected to a horizontal link $h^2$, which runs forward to the head of the bicycle parallel with the upper bar of the frame. The upper end of the link $h^2$ is connected to a lever $h^3$, which is pivotally mounted on the frame just to the rear of the head. This lever $h^3$ is provided with a hand operating portion, as $h^4$, which extends into close proximity to the guiding-handles of the bicycle and is within easy reach of the rider. By moving the handle $h^4$ up or down, as indicated in dotted lines in Fig. 1, the sleeve $g^4$ may be caused to revolve upon the hub of the wheel and change the speed thereof or bring the brake into action, as may be required. If preferred, the upper connecting-link, as $h^5$, may be placed interiorly of the upper tube of the bicycle-frame, as illustrated in Fig. 3 of the drawings, and the hand operating-lever $h^6$ may be pivoted so as to have one end extended into the said upper tube, as illustrated in Fig. 13 of the drawings. It will be apparent that this change may be made in the construction without departing in the least from the spirit of my invention.

In constructing a wheel of this character it is desirable not to have to tighten the sprocket chain or cable by adjusting the rear wheel in the frame, and in order to accomplish this purpose easily and effectively I have conceived the idea of mounting the crank-axle in such a manner as to be able to tighten the chain at that end. As illustrated in Figs. 1, 9, 10, and 11, it will be seen that the crank-axle J is mounted in an eccentric drum $j$, the said drum being held in place by a ring or sleeve $j'$, forming the crank-hanger proper of the frame. The axle J is eccentrically mounted in the said drum upon ball-bearings, as $j^2$, mounted in the inner eccentrically-arranged sleeve or drum $j^3$. A socket, as $j^4$, is formed in the drum $j$ and is adapted to be engaged by means of a wrench or lever $j^5$, which may be inserted therein through a slot $j^6$, formed in the crank-hanger $j'$. This slot is made of sufficient length to permit of the required adjustment to take up the slack in the cable or chain. When the cable or chain becomes slack, all that is necessary to take up such slackness is to insert the lever $j^5$ through the slot $j^6$ into the socket $j^4$ and turn the eccentric drum $j$ a sufficient distance to give the chain or cable the desired tautness.

In Fig. 14 of the drawings I have illustrated a slightly-modified form of my improved speed-changing mechanism. In this form the brake-disk K is secured to the hub, as above described, but is provided with a grooved portion, as $k$, the said grooved portion being formed with an outer annular groove and an inner annular groove. The inner annular groove is adapted to receive ball-bearings interposed between it and the sleeve $k'$, formed upon the cone of the wheel. The outer groove of the grooved portion $k$ is adapted to receive ball-bearings, as $k^2 k^2$, which are interposed between the said brake-disk and an annular sleeve $k^3$. The said sleeve is provided with an internal inwardly-extending flange $k^4$, which is adapted to pass between the said ball-bearings, so that by moving the said sleeve $k^3$ longitudinally with respect to the axle it will by means of the ball-bearings $k^2$ actuate the hub of the wheel to move it longitudinally, as above described. The annular sleeve $k^3$ is provided with pins $k^5 k^5$, extending through the longitudinal slots formed in the flange of the cone and engaging a rotating collar $k^6$, which corresponds to the collar $g^4$ above described and is provided with similar inclined grooves. The collar $k^6$ is also adapted to be rotated by the same system of levers as above described. In this construction a coil-spring, as M, is interposed between the brake-disk K and a loose disk, as $m$, mounted upon the sleeve $k'$. This sleeve tends to force the frictional cup $m'$ into engagement with the frictional flange of the stud-plate $m^2$, as above described. In order to permit the spring to be carried around with the brake-disk K in its revolution, an antifrictional bearing should be interposed between the loose disk $m$ and the frictional cup $m'$. I prefer to use a loose disk provided with ball-bearings, as $m^3$, for this purpose.

I do not wish to be understood as being limited to the application of my changeable-speed mechanism to the rear axle of a bicycle, as it will be apparent that I could apply the same to the crank-axle without departing from the spirit of my invention. In adapting it thus to the crank-axle of a bicycle I would dispense with the means for tightening the chain above described and would accomplish the same by adjusting the rear wheel in any suitable or desired manner.

As shown in Fig. 4 of the drawings, the side of the hub farthest from the cable-pulley may be closed by means of a washer O, which fits around the sleeve $g^4$. This washer will serve to keep dust and dirt out of the hub and away from the frictional contacts.

As illustrated in Figs. 15, 16, 17, and 18, it will be apparent that instead of using a cam-collar, as $g^4$, I may employ cam-plates having cam-raised surfaces formed upon them to move the frictional surfaces into and out of contact, according as it is desired to change the speed of the vehicle. In this construction a cam-plate, as P, is mounted upon a sleeve, as $p$, the said sleeve being loosely mounted upon a flange of the brake-cup. The collar $p$ is preferably L-shaped in cross-section and has interposed between it and the brake-cup roller-bearings, as $p'$, so that the brake-cup may be free to revolve with the hub without friction against the sleeve $p$. The cam-plate P is provided with a projection or stud $p^2$, which engages an aperture on the cup P', which is secured to one of the cones and is rigidly fixed upon the axle of the bicycle. By means of this stud the plate P is held against rotation with the hub of the wheel. The cam-plate P is provided with a series of raised portions, forming cams, as $p^3$. Another cam-plate, as $P^2$, is also mounted on the collar $p$ and is provided with raised portions, forming cam-surfaces, as at $p^4$ $p^5$. The cam-surface $p^5$ is raised a little more than the cam-surface $p^4$. A projection or arm, as $p^6$, is formed upon the cam-plate $P^2$ and is adapted to be connected with a system of levers extending within reach of the rider, as above described, by which the cam-plate may be operated, as desired. It will be apparent that by rotating the cam-plate $P^2$ with respect to the cam-plate P the corresponding raised surface or cam portions of the cam-plates will be caused to engage each other and force the hub of the wheel laterally with respect to the axle, producing the same result as the sleeve $g^4$ above described. It will be evident that the cam-surface may be regulated to suit the needs of the device and that this form of my invention also affords a simple device for changing the speed mechanism of the bicycle.

It will be evident from the above description that I am enabled by my invention to produce a very effective speed-changing mechanism for a bicycle and one which can be readily changed by the rider at any time, so that a high speed can be used upon level places and where desired and a lower speed can be instantly available for climbing hills or other places where great power is needed. It will also be apparent that the brake can be applied slightly or with great power at an instant's notice and that the speed of the wheel can thus be regulated exactly to suit the rider.

Having now described my invention, what I claim as new, and desire to secure by Letters Patent, is—

1. In a changeable-speed mechanism for bicycles or similar vehicles, the combination with a hub, of a loose sleeve mounted upon the axle, means for imparting motion to the said sleeve, gearing interposed between the said sleeve and the hub and means for moving the hub with respect to the axle for bringing the said gearing into and out of engagement whereby the speed of the hub may be increased or diminished as desired, substantially as described.

2. In a bicycle or similar vehicle, the combination with a suitable hub, of a sleeve loosely mounted upon the axle, means for rotating the same, a frictional cup upon the said sleeve adapted to engage a corresponding frictional surface upon the hub, gearing interposed directly between the said hub and the said sleeve and means for moving the hub for changing the speed, substantially as described.

3. In a bicycle, the combination with a suitable hub of a sleeve loosely mounted on the axle, ball-bearings interposed between said sleeve and the axle, a frictional surface formed on the said sleeve, a corresponding frictional surface mounted on the hub adapted to engage the said frictional surface on the sleeve, whereby the motion of the sleeve may be communicated to the hub, intermediate gearing interposed between the said hub and the said sleeve and means for moving the hub for changing the speed, substantially as described.

4. In a bicycle, the combination with a suitable hub, of a brake-plate mounted interiorly thereof, and rigidly secured thereto, a longitudinally-moving collar engaging the said brake-plate for moving it bodily against a friction-cup, a friction-cup secured to the axle for braking the wheel, and means for moving said collar longitudinally with respect to the hub, substantially as described.

5. In a bicycle, the combination with a suitable hub, of a sleeve loosely mounted on the axle, means for rotating the same, a stud-plate also loosely mounted on the said sleeve, intermediate gearing mounted upon the said stud-plate and engaging gearing upon the hub and upon the said sleeve, means for moving the hub for bringing the said stud-plate against a stationary part of the bicycle whereby the gearing will be adapted to communicate motion from the sleeve to the hub, substantially as described.

6. In a bicycle, the combination with a suitable hub, of a sleeve mounted upon the axle, means for connecting the said hub and sleeve together, means for rotating the said sleeve, a stud-plate loosely mounted on the said sleeve and carrying intermediate gearing interposed between said hub and said sleeve, a frictional cup secured to the axle of the wheel so as to revolve therewith but capable of longitudinal movement thereon, a spring for holding the said cup normally against the stud-plate and means for moving the hub of the wheel longitudinally of the axle whereby the speed of the wheel may be changed as desired, substantially as described.

7. In a bicycle, the combination with a suitable hub, of a brake-disk secured to the said hub, a grooved sleeve mounted upon the frame, antifrictional bearings interposed between the said grooved sleeve and the brake-disk and means for moving the said grooved sleeve longitudinally with respect to the axle whereby the brake-disk may be brought into engagement with a portion of the frame as may be desired, substantially as described.

8. In a bicycle, the combination with a suitable hub, of gearing interposed between the same and an operating mechanism, a brake-disk secured to the said hub, a grooved plate mounted upon the frame, ball-bearings interposed between said grooved plate and said brake-disk, studs formed upon the said grooved plate and extending through longitudinal slots in a fixed portion of the hub, a revolving sleeve having inclined slots adapted to engage the outer ends of said studs, and means for rotating the said sleeve whereby the grooved plate is caused to move longitudinally for changing the gearing of the hub and operating the brake-disk, substantially as described.

9. In a bicycle, the combination with a suitable hub, of changeable-speed mechanism interposed between the same and the actuating mechanism, a grooved plate for moving the hub to change the said speed mechanism, studs formed upon the said plate, an annular sleeve provided with diagonal grooves adapted to engage said studs, a system of links and levers connected with the said sleeve and carried within easy reach of the rider whereby the same may be rotated for changing the speed of the wheel, substantially as described.

10. In a bicycle, the combination with a suitable hub, of changeable-speed mechanism interposed between the same and the source of power, a rotating sleeve connected with the speed-changing mechanism adapted to move the hub longitudinally with respect to the axle for changing the speed, a link secured to the said sleeve at one end and connected to a bell-crank lever at the other, another link also connected to the said bell-crank lever and a hand operating-lever connected to said link, whereby the rider may move the said links and rotate the sleeve for changing the speed of the mechanism, substantially as described.

11. In a bicycle, the combination with a suitable hub, of a sleeve loosely mounted on the axle, means for rotating the said sleeve, a stud-plate also loosely mounted upon said sleeve, intermediate gearing mounted upon the said stud-plate for communicating motion from the sleeve to the hub, a non-revoluble friction member upon the axle, means for moving the said non-revoluble friction member against the said stud-plate for holding it stationary, and antifrictional rollers mounted upon the said hub adapted to engage the said plate for disengaging it from the said friction member, substantially as described.

12. In a bicycle, the combination with a suitable hub, of changeable-speed mechanism mounted therein, a revolving sleeve or collar adapted to move the hub into and out of engagement with the same, a stud formed on the same collar, a link connected to the said stud at one end and pivotally secured to a bell-crank lever at the other end, a bell-crank lever pivotally mounted on the frame, a link secured to said bell-crank lever and carried toward the head of the bicycle, a hand operating-lever pivotally mounted within the head of the bicycle and secured to the said link, the construction being such that by operating the hand-lever, the said revolving sleeve may be rotated through the agency of the said links for changing the speed of the bicycle, substantially as described.

In testimony whereof I affix my signature in presence of two witnesses.

JOHN WASHINGTON EISENHUTH.

Witnesses:
J. A. HILTON,
J. W. PHILLIPS.